(12) United States Patent
Li et al.

(10) Patent No.: US 9,465,998 B2
(45) Date of Patent: Oct. 11, 2016

(54) OBJECT DETECTING DEVICE AND OBJECT DETECTING METHOD

(71) Applicant: HITACHI, LTD., Tokyo (JP)

(72) Inventors: Yuan Li, Hitachinaka (JP); Masanori Miyoshi, Mito (JP); Masaya Itoh, Hitachinaka (JP); Ryo Yumiba, Hitachi (JP); Shunichi Kaneko, Sapporo (JP); Hironobu Fujiyoshi, Kasugai (JP)

(73) Assignee: Hitachi, Ltd., Tokyo (JP)

( * ) Notice: Subject to any disclaimer, the term of this patent is extended or adjusted under 35 U.S.C. 154(b) by 564 days.

(21) Appl. No.: 13/904,064

(22) Filed: May 29, 2013

(65) Prior Publication Data

US 2013/0321624 A1 Dec. 5, 2013

(30) Foreign Application Priority Data

May 30, 2012 (JP) ................................ 2012-122856

(51) Int. Cl.
*G06K 9/00* (2006.01)
(52) U.S. Cl.
CPC ....... *G06K 9/00771* (2013.01); *G06K 9/00369* (2013.01)
(58) Field of Classification Search
CPC ............................................... G06K 9/00771
USPC ........................................................ 348/135
See application file for complete search history.

(56) References Cited

U.S. PATENT DOCUMENTS

2005/0280809 A1* 12/2005 Hidai ................. G06K 9/00248
356/237.3
2010/0283845 A1* 11/2010 Yokochi ............. G06K 9/00805
348/135

FOREIGN PATENT DOCUMENTS

| JP | 2002-29421 A | 1/2002 |
| JP | 2008-015771 A | 1/2008 |
| JP | 2009-87253 A | 4/2009 |
| JP | 2009-223540 A | 10/2009 |
| JP | 2010-140315 A | 6/2010 |
| JP | 2012-221437 A | 11/2012 |

OTHER PUBLICATIONS

European Search Report received in corresponding European Application No. 13169559 dated Sep. 5, 2014.
D. Geronimo et al., "2D-3D-based on-board pedestrian detection system", Computer Vision and Image Understanding, Academic Press, US, vol. 114, No. 5, May 1, 2010, pp. 583-595.
G. Duan et al. "Scene Aware Detection and Block Assignment Tracking in crowded scenes", Image and Vision Computing, Guildford, GB, vol. 30, No. 4, Feb. 10, 2012, pp. 292-305.

(Continued)

*Primary Examiner* — Yulin Sun
(74) *Attorney, Agent, or Firm* — Mattingly & Malur, PC (57) ABSTRACT

An object detecting device includes an image acquiring unit which acquires an image from a camera, a scanning interval calculating unit which calculates a scanning interval when a scanning window is scanned on the image based on a size on the image of a detection object that is detected by the detecting window, a scanning unit which scans on the image using the scanning interval that is calculated by the scanning interval calculating unit, and a detecting unit which determines whether the detection object is present within the scanned detecting window.

12 Claims, 10 Drawing Sheets

(56) References Cited

OTHER PUBLICATIONS

P. Dollar et al., "Pedestrian Detection: An Evaluation of the State of the Art", vol. 34, No. 4, Apr. 1, 2012, pp. 743-761.
N. Dalai and B. Triggs, "Histograms of oriented gradients for human detection," in CVPR (1), pp. 886-893, 2005.
Tomokazu Mitsui, Yuji Yamauchi, Hironobu Fujiyoshi, "Object Detection by Two-stage Boosting with Joint Features", Proceedings of the Institute of Electronics, Information and Communication Engineers, vol. J92-D, No. 9, pp. 1591-1601, 2009.
R. Y. Tsai, "A versatile camera calibration technique for high-accuracy 3D machine vision metrology using off-the-shelf TV camera and lenses" IEEE Journal of Robotics and Automation, vol. RA-3, No. 4, pp. 323-344, 1987.
N. Dalal et al., "Histograms of oriented gradients for human detection," in CVPR (1), pp. 886-893, 2005.
T. Mitsui et al., "Object Detection by Two-stage Boosting with Joint Features," Proceedings of the Institute of Electronics, Information and Communication Engineers, vol. J92-D, No. 9, pp. 1591-1601, 2009.
R.Y. Tsai, "A versatile camera calibration technique for high-accuracy 3D machine vision metrology using off-the-shelf TV camera and lenses" IEEE Journal of Robotics and Automation, vol. RA-3, No. 4, pp. 323-344, 1987.
Japanese Office Action received in corresponding Japanese Application No. 2012-122856 dated Sep. 8, 2015.

\* cited by examiner

OBJECT DETECTING DEVICE AND OBJECT DETECTING METHOD

FIELD OF THE INVENTION

The present invention relates to an object detecting device and an object detecting method for detecting a specific object from an image.

BACKGROUND OF THE INVENTION

It is known that there is an object detecting device which detects whether a specific object (detection object) is included in an area of a detecting window by template matching or the like while scanning the detecting window on an image that is taken by a camera. According to the object detecting device, in detecting the object on the image, when the detecting window is scanned by shifting the detecting window pixel by pixel, an operation amount is increased. Therefore, there are a number of proposals for an object detecting technology which reduces an operation amount.

For example, Japanese Unexamined Patent Application Publication No. 2008-015771 describes an image recognizing device which is featured in including extracting means for extracting a determination object area from an input image taken by a camera, recognizing means for recognizing presence of a specific object by comparing an image of the determination object area and a reference image, and interval controlling means for controlling an interval of positions of extracting the determination object areas by the extracting means based on a position thereof in the input image. Japanese Unexamined Patent Application Publication No. 2008-015771 describes that the extraction is carried out again by reducing an extraction interval at a vicinity of a position at which it is determined that a degree of coincidence with the reference image is comparatively high by a recognizing processing by the recognizing means.

Japanese Unexamined Patent Application Publication No. 2010-140315 describes an object detecting device of detecting a detection object from an image which is featured in including an image acquiring unit which acquires the image, an identifier device which inputs a detecting window area image that is set with a detecting window from the image that is inputted from the image acquiring unit, and which outputs a determination of whether the detection object is present in the detecting window area image, and a reliability that indicates an assurance degree of presence of the detection object in the determination, detecting window controlling means in which the higher the reliability, the shorter the scanning interval of the detecting window is set thereafter, and determining means for determining whether the detection object is present based on an output from the identifier device.

SUMMARY

However, according to the object detecting technologies of the background arts, when the interval of scanning the detecting window is thin, there poses a problem that the detection object is out of the detecting window, and an omission of detection is brought about.

For example, according to Japanese Unexamined Patent Application Publication No. 2008-015771, even when the scanning interval is varied for lower side and upper side positions in the inputted image, when the varied scanning interval is not pertinent, an oversight of an area which has a high degree of presence of the object is brought about, and a detection accuracy of the object detecting device is lowered. Similarly, according to Japanese Unexamined Patent Application Publication No. 2010-140315, even when the scanning interval is set to be short based on the reliability, when the set scanning interval is not pertinent, the oversight of the area having the high degree of presence of the object is brought about, and a detection accuracy of the object detecting device is lowered.

Hence, it is a problem of the present invention to provide an object detecting device and an object detecting method at a high speed and with a high accuracy in consideration of an operation amount and an omission in detecting a detection object.

In order to address the problem, the present invention is an object detecting device which is featured in including an image acquiring unit that acquires an image from a camera, a scanning interval calculating unit which calculates a scanning interval when a detecting window is scanned on the image based on a size on the image of the detection object that is scanned by the detecting window, a scanning unit which scans on the image using the scanning interval that is calculated by the scanning interval calculating unit, and a detecting unit which determines whether the detection object is present within the scanned detecting window.

Also, the present invention is an object detecting method which is featured in including a step of calculating a scanning interval when a scanning window is scanned on an image based on a size on the image of a detection object that is detected by the detecting window, a step of scanning the detecting window on the image using the calculated scanning interval, and a step of determining whether the detection object is present within the scanned detecting window.

According to the aspects of the present invention, there can be provided an object detecting device and an object detecting method at a high speed and with a high accuracy in consideration of an operation amount and an omission in detecting a detection object.

DETAILED DESCRIPTION OF THE PREFERRED EMBODIMENTS

A detailed description will be given of a mode for carrying out the present invention (hereinafter, referred to as "embodiment") pertinently in reference to the drawing as follows. Incidentally, a redundant description will be omitted by attaching the same notation to the common portions of the respective drawings.

First Embodiment

Object Detecting Device

Figure 1:
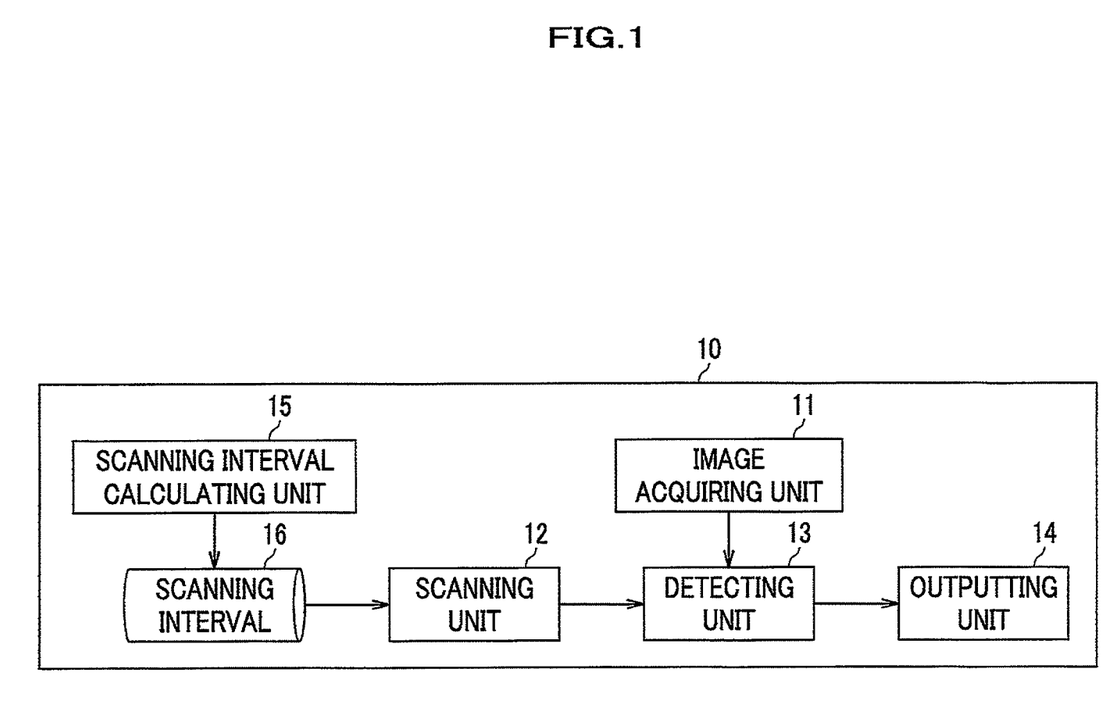
FIG. 1 is a functional block diagram of an object detecting device according to a first embodiment.

A description will be given of an object detecting device 10 according to a first embodiment in reference to FIG. 1. FIG. 1 is a functional block diagram of the object detecting device 10 according to the first embodiment.

The object detecting device 10 includes an image acquiring unit 11, a scanning unit 12, a detecting unit 13, an outputting unit 14, and a scanning interval calculating unit 15 which calculates a scanning interval 16 to output to the scanning unit 12, and is configured to detect a specific object (detection object) from an acquired image.

Here, although a person, an animal, an object or the like is applicable as the detection object of the object detecting device 10, in the following description, the description will be given such that the detection object is a person. In the following description, the description will be given such that the object detecting device 10 detects a person (detection object) from an image of a monitoring camera installed at a store.

The object detecting device 10 is, for example, a computer, not illustrated, and includes ROM (Read Only Memory) which is stored with an initial boot program in a power-on state or the like, RAM (Random Access Memory) which is used as a working memory, HDD (Hard Disc Drive) which is stored with OS (Operations System), various application programs, various parameters and the like, CPU (Central Processing Unit) as an operation unit, and I/O (Input/Output), and the respective units are connected by a bus line.

The CPU is made to function as the scanning unit 12, the detecting unit 13, the outputting unit 14, and the scanning interval calculating unit 15 by executing the various application programs which are stored in HDD. I/O is made to function as the image acquiring unit 11, and the outputting unit 14 described later.

The image acquiring unit 11 is configured to take an image inputted which is taken from an image taking device of a monitoring camera (not illustrated) or the like, and output an inputted image to the detecting unit 13.

The scanning unit 12 is configured to scan a detecting window using the scanning interval 16 which is inputted from the scanning interval calculating unit 15, described later, and cut out a detecting area (see number 38 in FIG. 3, described later). The scanning unit 12 is configured to output the cut-out detecting area to the detecting unit 13. Incidentally, a description will be given later of a configuration of the scanning unit 12 in reference to FIG. 3.

The detecting unit 13 is configured to identify whether the corresponding detecting area on the image has the detection object therein using the detecting area which is inputted from the scanning unit 12, and the image which is inputted from the image acquiring unit 11. When identifying the detection object in the corresponding detecting area on the image, the detecting unit 13 is configured to output the detecting area to the outputting unit 14.

Various methods may be used for a method of identifying the detection object in the detecting unit 13, and the method is not limited.

For example, the template matching described in Japanese Unexamined Patent Application Publication No. 2008-015771, or a method of determining the detection object by the identifier device described in Japanese Unexamined Patent Application Publication No. 2010-140315 can be used. As the method of determining the detection object by the identifier device, a method described in "N. Dalal and B. Triggs, "Histograms of oriented gradients for human detection," in CVPR (1), pp. 886-893, 2005" or "Tomokazu Mitsui, Yuji Yamauchi, Hironobu Fujiyoshi, "Object Detection by Two-stage Boosting with Joint Features", Proceedings of The Institute of Electronics, Information and Communication Engineers, Vol. J92-D, No. 9, pp. 1591-1601, 2009" can be used.

The outputting unit 14 is configured to generate a detection result based on the detecting area which is inputted from the detecting unit 13, and output the detection result to an outputting device (not illustrated).

As the detection result which is outputted from the outputting unit 14, various modes of an image, a signal, an alarm and the like can be selected. The outputting device can also be selected in accordance therewith and is not limited.

For example, an image which is displayed by overwriting a frame of the detecting area that is identified as the detection object on the image that is inputted by the image acquiring unit 11 may be outputted to a monitor (display device) as the detection result. A message indicating that the detection object is detected may be outputted to a monitor (display device). A message indicating that the detection object is detected may be transmitted to a portable telephone terminal by mail.

The scanning interval calculating unit 15 is configured to calculate the pertinent scanning interval 16 by a position of the inputted image. The scanning interval calculating unit 15 is configured to output the calculated scanning interval 16 to the scanning unit 12. A description will be given later of a configuration of the scanning interval calculating unit 15 in reference to FIG. 2.

<Scanning Interval Calculating Unit 15>

Figure 2:
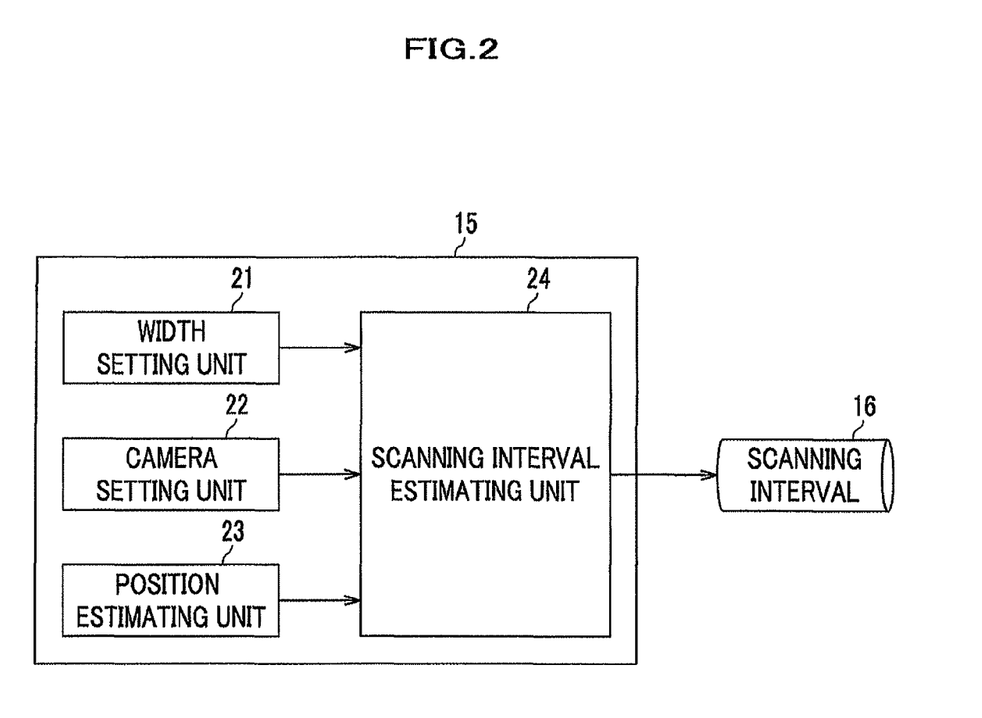
FIG. 2 is a functional block diagram of a scanning interval calculating unit which is included in the object detecting device according to the first embodiment.

Next, a description will further be given of the scanning interval calculating unit 15 in reference to FIG. 2. FIG. 2 is a functional block diagram of the scanning interval calculating unit 15 which is included in the object detecting device 10 according to the first embodiment.

The scanning interval calculating unit 15 includes a width setting unit 21, a camera setting unit 22, a position estimating unit 23, and a scanning interval estimating unit 24.

The width setting unit 21 is configured to set information of a width of the detection object which is detected on a three-dimensional space. Here, according to the present embodiment, information of a width of a person is set in order to describe such that the detecting unit is a person. Information of a width of a detection object (information of width of person) is inputted by an inputting device (for example, keyboard) connected to I/O of the object detecting device 10, and stored to HDD of the object detecting device 10.

The camera setting unit 22 is configured to set a camera parameter. The camera parameter is inputted by an inputting device (for example, keyboard) connected to I/O of the object detecting device 10, and stored to HDD of the object detecting device 10.

Here, the camera parameter indicates parameters of the intrinsic parameters and the extrinsic parameters of a monitoring camera. The intrinsic parameters are a focal length of a camera, a center of an image coordinate, a lens distortion coefficient, and an aspect ratio of the image coordinate. The extrinsic parameters are a translation vector with an origin of a world coordinate system as a reference, and a 3 row 3 column rotations vector.

With regard to definitions and ways of calculating the camera parameters, for example, a method described in "R. Y. Tsai, "A versatile camera calibration technique for high-accuracy 3D machine vision metrology using off-the-shelf TV camera and lenses" IEEE Journal of Robotics and Automation, Vol. RA-3, No. 4, pp. 323-344, 1987" can be used.

The position estimating unit 23 is configured to calculate a distance between a monitoring camera on a three-dimensional space and a position to be scanned by estimating three-dimensional information (position information on three-dimensional space) of the position to be scanned.

The scanning interval estimating unit 24 is configured to calculate the scanning interval 16 on an image using the width of the detection object (width of person) which is set by the width setting unit 21, the camera parameters which is set by the camera setting unit 22, and the distance estimated by the position estimating unit 23 for the position to be scanned which is estimated by the position estimating unit 23. The scanning interval estimating unit 24 is also made to be able to output the calculated scanning interval 16 to the scanning unit 12 (see FIG. 1).

A description will be given of a method of calculating the scanning interval 16 at the scanning interval estimating unit 24.

First, the scanning interval estimating unit 24 transforms the width of the detection object (width of person) which is set by the width setting unit 21 from the width on the three-dimensional space to a width on the image using the camera parameters which are set by the camera setting unit 22 and the distance which is estimated by the position estimating unit 23 for the position to be scanned which is estimated by the position estimating unit 23. The transformation can use a method of transforming a width on a three-dimensional space to a width on an image which is described in, for example, the paper of R. Y. Tsai described above (hereinafter, referred to as "method of Tsai").

The scanning interval estimating unit 24 outputs a length which is equal to or smaller than a transformed width of the detection object (width of person) on the image as the scanning interval 16 at the scanning position.

Here, when the scanning interval 16 is a half of the width of the detection object (width of person) by an investigation beforehand, an occurrence of an oversight of the detection object can sufficiently be reduced, and an efficient scanning can be carried out.

In this way, the scanning interval calculating unit 15 is configured to automatically calculate the scanning interval 16 by the width of the detection object (width of person), the camera parameters, and the scanning position.

<Scanning Unit 12>

Figure 3:
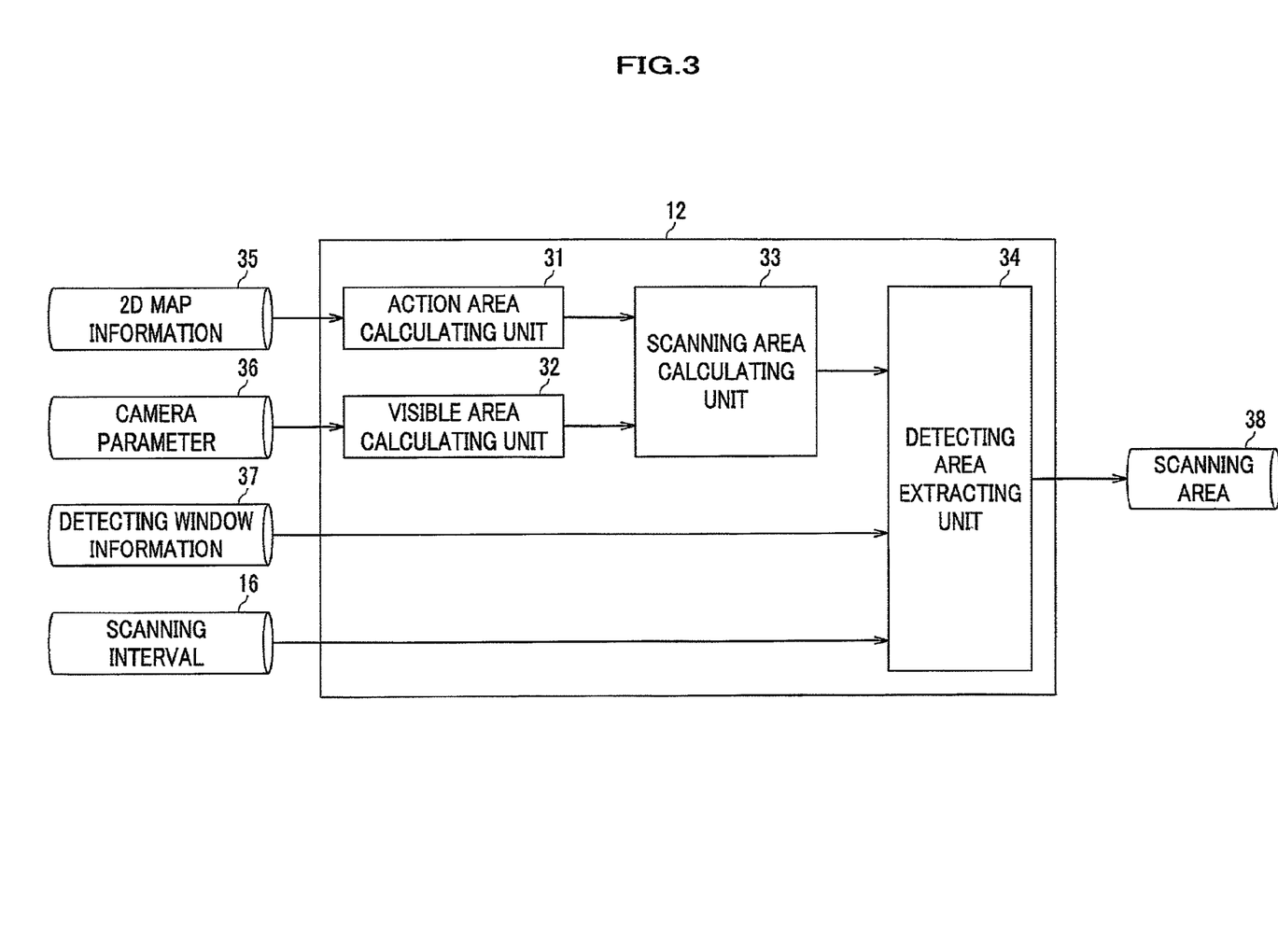
FIG. 3 is a functional block diagram of a scanning unit which is included in the object detecting device according to the first embodiment.

Next, a description will further be given of the scanning unit 12 in reference to FIG. 3. FIG. 3 is a functional block diagram of the scanning unit 12 included in the object detecting device 10 according to the first embodiment.

The scanning unit 12 includes an action area calculating unit 31, a visible area calculating unit 32, a scanning area calculating unit 33, and a detecting area extracting unit 34, and is configured to extract a scanning area 38 based on 2D map information 35, a camera parameter 36, detecting window information 37, and the scanning interval 16.

The action area calculating unit 31 is configured to calculate an action area which is an area in which a person (detection object) is present from the 2D map information 35.

Figure 4A:
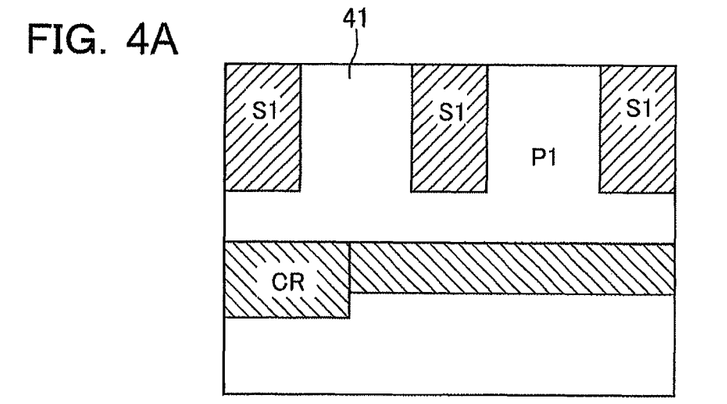
FIG. 4A shows an example of an action area of 2D map information.

Here, a description will be given of an example of a case in which the 2D map information 35 is as shown in FIG. 4A. For example, in a case of a store, the 2D map information 35 is configured by a layout of a passage P1 (indicated by a white-coated portion of FIG. 4A), a shelf S1 (indicated by a hatching of a leftward drooping inclined line in FIG. 4A), and a cash register CR (indicated by a hatching of a rightward drooping inclined line in FIG. 4A). The 2D map information 35 is previously stored to HDD of the object detecting device 10 via I/O of the object detecting device 10.

On the 2D map shown in FIG. 4A, a location where a person (detection object) is present is the passage. The action area calculating unit 31 therefore deletes areas of the shelf S1 and the cash register CR from the 2D map information 35 and configure an action area 41 by taking out only the passage P1. The action area calculating unit 31 transforms the action area 41 of the 2D map information 35 from that on a three-dimensional space to that on an image.

Various methods can be used for a method of transforming the action area 41 on the three-dimensional space to the action area 41 on the image at the action area calculating 31, and the method is not limited.

For example, the action area calculating unit 31 configures the 2D map information 35 into an image. The action area calculating unit 31 can calculate an area of only the passage (action area) by calculating a difference from an image that is inputted from the image acquiring unit 11. When the 2D map information 35 indicates an actual position of the passage, the action area calculating unit 31 can transform the actual position on the three-dimensional space to that on the image using the camera parameter. The method of Tsai described above can be used for the transformation.

Figure 4B:
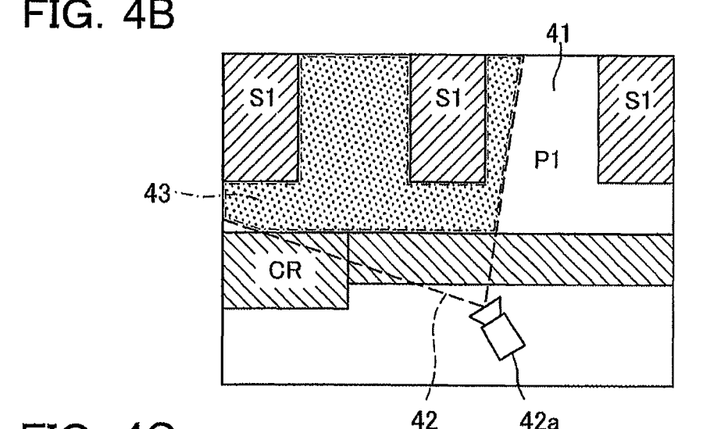
FIG. 4B shows an example of an action area, a visible area, and a scanning area of the 2D map information.

The visible area calculating unit 32 is configured to calculate a visible area of a monitoring camera. FIG. 4B shows an area interposing a visible area 42 of a monitoring camera 42a in the 2D map information 45 by 2 pieces of broken lines. Incidentally, the camera parameter 36 which is set by the camera setting unit 22 (see FIG. 2) can be used for the camera parameter 36.

Various methods can be used for the method of calculating the visible area in the visible area calculating unit 32 and the method is not limited.

For example, a visible area on the three-dimensional space can be calculated using an angle of view of a camera. A visible range can also be estimated from a parameter of a camera by computer graphics (CG).

The scanning area calculating unit 33 is configured to calculate a scanning area 43 based on the action area 41 which is calculated by the action area calculating unit 31 and the visible area 42 which is calculated by the visible area calculating unit 32. FIG. 4B shows a scanning area 43 of the 2D map information 35 by netting which is surrounded by a one-dotted chain line.

According to a method of calculating the scanning area 43, the visible area 42 which is calculated by the visible area calculating unit 32 within the action area 41 which is calculated by the action area calculating unit 31 is calculated as the scanning area 43. Or, an overlapped portion of the action area 41 and the visible area 42 may be calculated as the scanning area 43.

The detecting area extracting unit 34 is configured to extract the detecting area 38 based on the detecting window information 37, the scanning area 43 which is calculated by the scanning area calculating unit 33, and the scanning interval 16 of the scanning interval calculating unit 15 (see FIG. 1, FIG. 2). Here, the detecting window information 37 includes at least information of a size and a shape of the detecting window, inputted by an inputting device (for example, keyboard) which is connected to I/O of the object detecting device 10, and stored to HDD of the object detecting device 10.

Figure 4C:
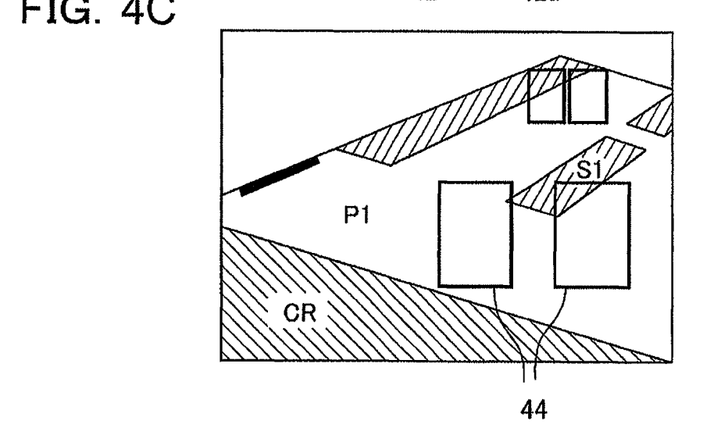
FIG. 4C shows an example of an image and a detecting area.

The detecting area extracting unit 34 is made to scan the detecting window which is set by the detecting window information 37 by the scanning interval 16 of the scanning interval calculating unit 15 (see FIG. 1, FIG. 2), extract the detecting area 38, and output the detecting area 38 to the detecting unit 13 (see FIG. 1) with regard to the scanning area 43 which is calculated by the scanning area calculating unit 33. The detecting unit 13 identifies whether there is a detection object by cutting out a detecting area 44 on an image as shown in FIG. 4C.

In this way, the scanning unit 12 can reduce a number of times of operations at the detecting unit 13 at a later stage by limiting an area of scanning the detecting window to the scanning area 43.

<Scanning Interval>

Next, a description will be given of a scanning interval in the object detecting device 10 according to the first embodiment in reference to FIG. 5 and FIG. 6.

Figure 5:
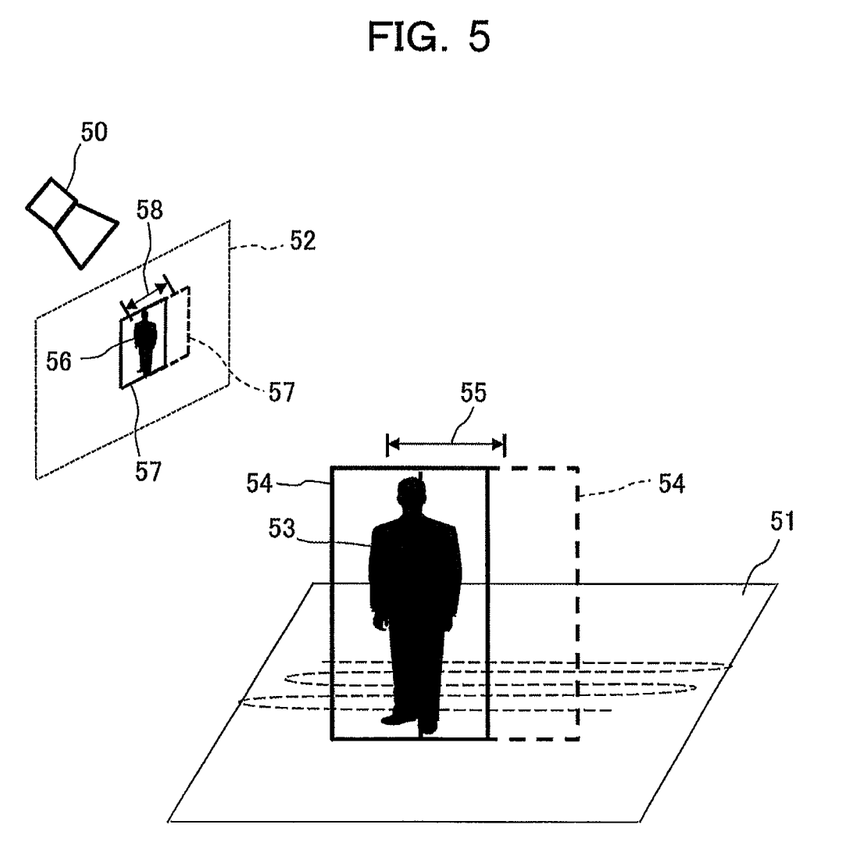
FIG. 5 is a view for explaining a calculation of a scanning interval.

FIG. 5 is a view for explaining calculation of a scanning interval.

In FIG. 5, a person 53 who is a detection object is shown on a three-dimensional space 51. A person 56 is shown in an image 52 which is taken by a camera 50.

First, the scanning interval calculating unit 15 of the object detecting device 10 (see FIG. 1 and FIG. 2) calculates a scanning interval 55 of a detecting area 54 on the three-dimensional space 51. The scanning interval calculating unit 15 calculates a scanning interval 58 of a detecting area 57 on an image 52 by transforming the scanning interval 55 on the three-dimensional space 51 to the scanning interval 58 on the image 52. Incidentally, for example, the "method of Tsai" described above may be used as a transforming method.

Here, although the scanning interval 55 on the three-dimensional space 51 differs by the detection object or the like, for example, the scanning interval 55 is set to be smaller than a size of the detection object in a scanning direction (horizontal direction of paper face in FIG. 5) in order to prevent an oversight of the detection object.

That is, a length of the scanning interval 58 in the image 52 is featured to be smaller than the size of the detection object on the image 52 in a scanning direction of a detecting window. For example, when the detection object is a person, the length of the scanning interval 58 is set to be equal to or smaller than a width of a person. Thereby, the oversight of the detection object can be reduced.

In this way, the scanning interval calculating unit 15 is configured to automatically calculate the scanning interval 16 based on the width of the detection object (width of person) for all of positions in the three-dimensional space.

Figure 6:
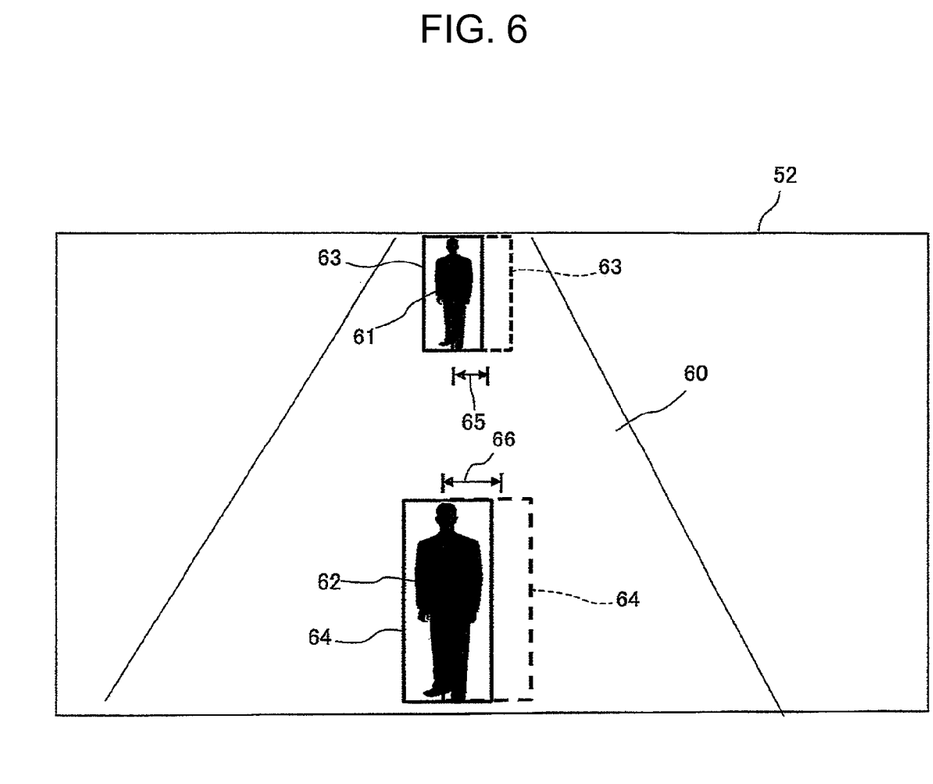
FIG. 6 shows an example of using a scanning interval which is calculated by the scanning interval calculating unit on an image.

FIG. 6 shows an example of using a scanning interval calculated by the scanning interval calculating unit on an image.

A passage 60 is shown in the image 52 as an action area (scanning area). As described above, the scanning unit 12 scans the road 60 which is a scanning area.

As shown in FIG. 6, a detecting area 63 is scanned by a scanning interval 65 for a person 61 who is present at a location which is remote from a camera. On the other hand, a detecting area 64 is scanned by a scanning interval 66 for a person 62 who is present at a location which is near to the camera. That is, as shown in FIG. 6, the scanning interval is varied depending on a distance between a position of the camera and a position to be scanned. That is, a scanning interval on a screen at a location which is remote from the camera is made to be smaller than a scanning interval on the screen at a location which is near to the camera.

Thereby, an oversight of the detection object is reduced by reducing an enlargement of a scanning interval on a three-dimensional space at a location which is remote from a camera.

The object detecting device according to the first embodiment is configured to detect an object by one time scanning from a location which is remote from a camera to a location which is near to the camera (or, from a location which is near to a camera to a location which is remote from the camera) while scanning in a horizontal direction as shown by a broken line in the three-dimensional space 51 of FIG. 5. In other words, the object detecting device 10 is configured to detect an object without scanning the same area on the image at plural times.

An operation amount is reduced by such a configuration in comparison with that of an image recognizing device in which an extraction having a smaller extraction interval is carried out again for a vicinity of a position at which a degree of coincidence with a reference image is determined to be comparatively high by a recognizing processing by recognizing means as in, for example, Japanese Unexamined Patent Application Publication No. 2008-015771.

<Object Detecting Processing>

Figure 7:
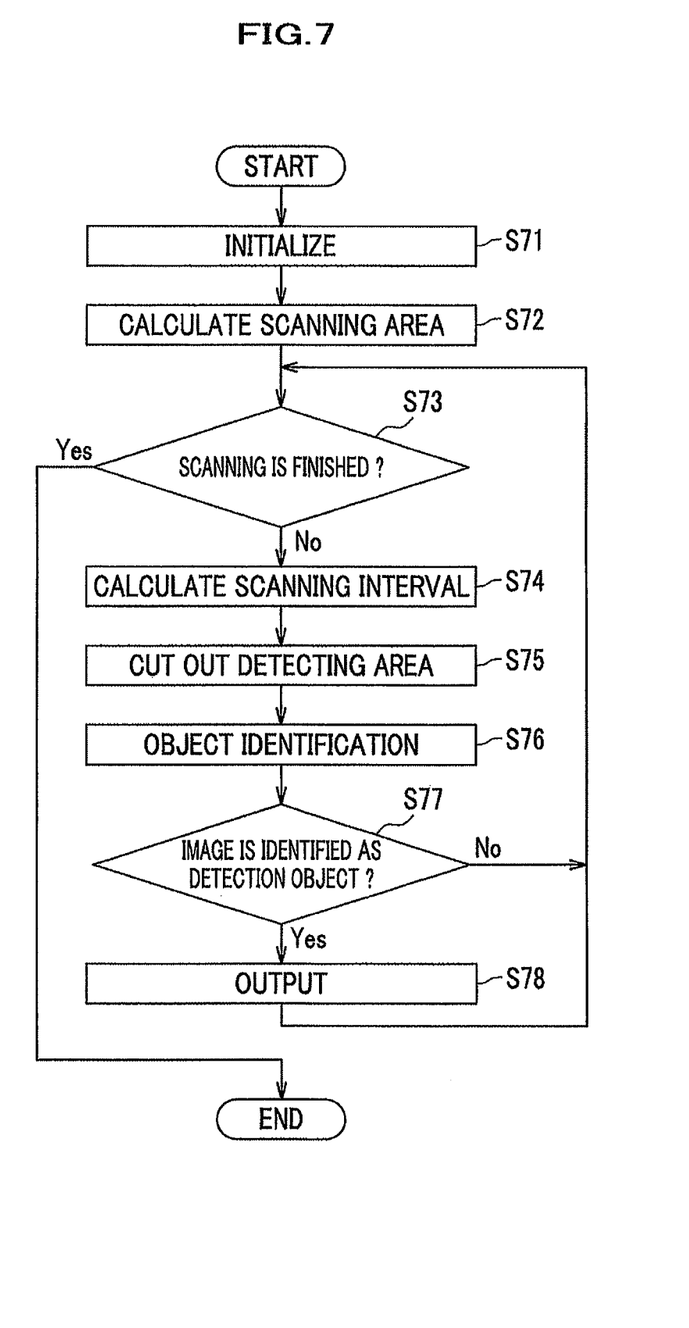
FIG. 7 is a flowchart showing an object detecting processing of the object detecting device according to the first embodiment.

Next, a description will be given of an object detecting processing of the object detecting device 10 according to the first embodiment in reference to FIG. 7. FIG. 7 is a flowchart showing the object detecting processing of the object detecting device 10 according to the first embodiment.

An initializing processing is carried out at step S71. For example, the width of the detecting object (width of person) is set (input) by the width setting unit 21, and the camera parameter (36), the 2D map information 35, and the detecting window information 37 are set (input) by the camera setting unit 22.

At step S72, the scanning unit 12 calculates the scanning area. The scanning area is calculated based on the action area which is calculated by the action area calculating unit 31, and the visible area which is calculated by the visible area calculating unit 32.

At step S73, the scanning unit 12 determines whether scanning of all of the scanning area is finished. When scanning of all of the scanning area is not finished (S73•No), the operation proceeds to step S74.

At step S74, the scanning interval calculating unit 15 calculates the scanning interval 16 on an image.

At step S75, the scanning unit 12 cuts out the detecting area using the scanning interval 16 which is calculated at step S74.

At step S76, the detecting unit 13 cuts out the image at the detecting area of step S75, and identifies whether the image is the detecting object (person).

At step S77, the detecting unit 13 determines whether a result of step S76 is identified as the detection object (person). When the result is not the detection object (S77: No), the operation returns to step S73. On the other hand, when the result is the detection object (S77: Yes), the operation proceeds to step S78. The outputting unit 14 outputs the result (step S78), and the operation returns to step S73.

Steps S73 through S78 are repeated by scanning the detecting area based on the scanning interval 16 which is calculated by the scanning interval calculating unit 15 until scanning of all of the scanning area is finished. When scanning of all of the scanning area is finished (S73: Yes), the processing is finished.

As described above, according to the object detecting device 10 of the first embodiment, an omission in detecting the detection object can be reduced, and an operation amount can be reduced. Thereby, the object detecting device 10 is applicable also to an inexpensive computer device having an operation processing capability of CPU which is lower than conventional one. When an operation processing capability of CPU stays equal, a processing time period of the object detecting processing (see FIG. 7) per image can be shortened more than conventional one. Therefore, a time period until finishing the object detecting processing after inputting the image can be shortened. In other words, a number of sheets of processings of an image per unit time is increased. Therefore, a frame rate of an output image is increased in a configuration of outputting a detection result from the outputting unit 14 by an image or the like.

Second Embodiment

Figure 8:
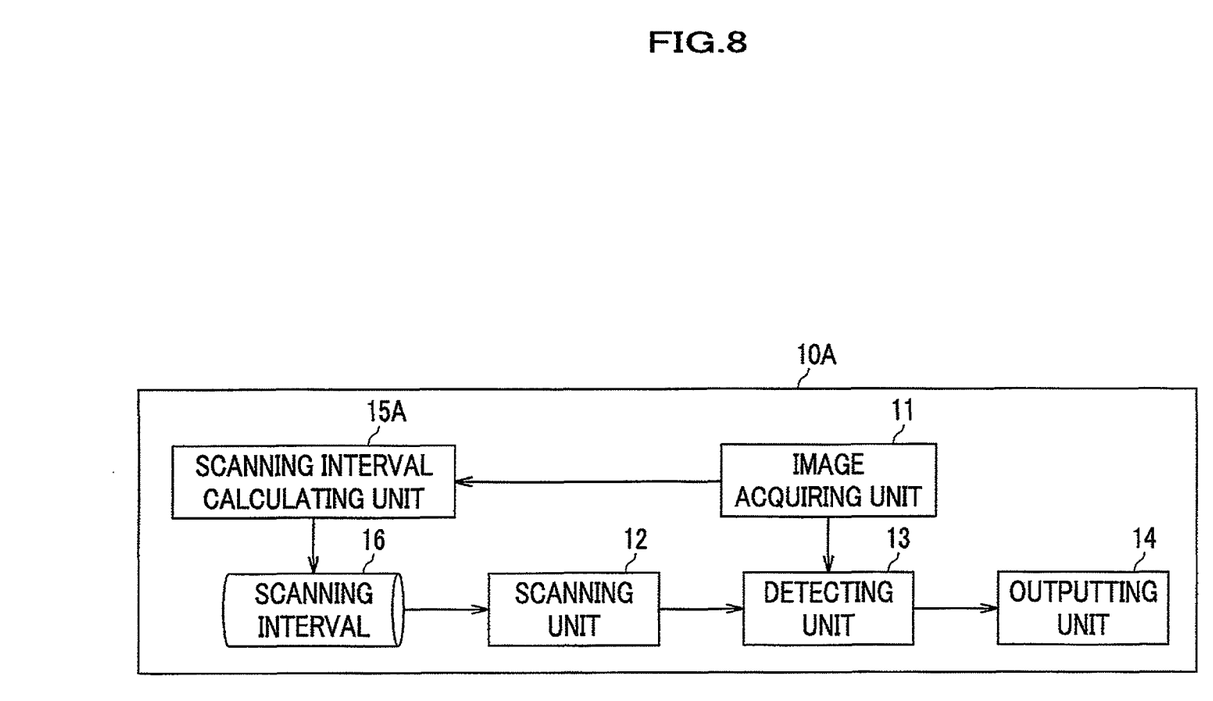
FIG. 8 is a functional block diagram of an object detecting device according to a second embodiment.

Next, a description will be given of an object detecting device 10A according to a second embodiment in reference to FIG. 8 through FIG. 10. FIG. 8 is a functional block diagram of the object detecting device 10A according to the second embodiment.

The object detecting device 10A includes an image acquiring unit 11, a scanning unit 12, a detecting unit 13, an outputting unit 14, and a scanning interval calculating unit 15A. Here, a difference between the object detecting device 10 (see FIG. 1) according to the first embodiment and the object detecting device 10A according to the second embodiment resides in that an image which is acquired by the image acquiring unit 11 is outputted also to the scanning interval calculating unit 15A. The other configuration is similar, and a description thereof will be omitted.

Figure 9:
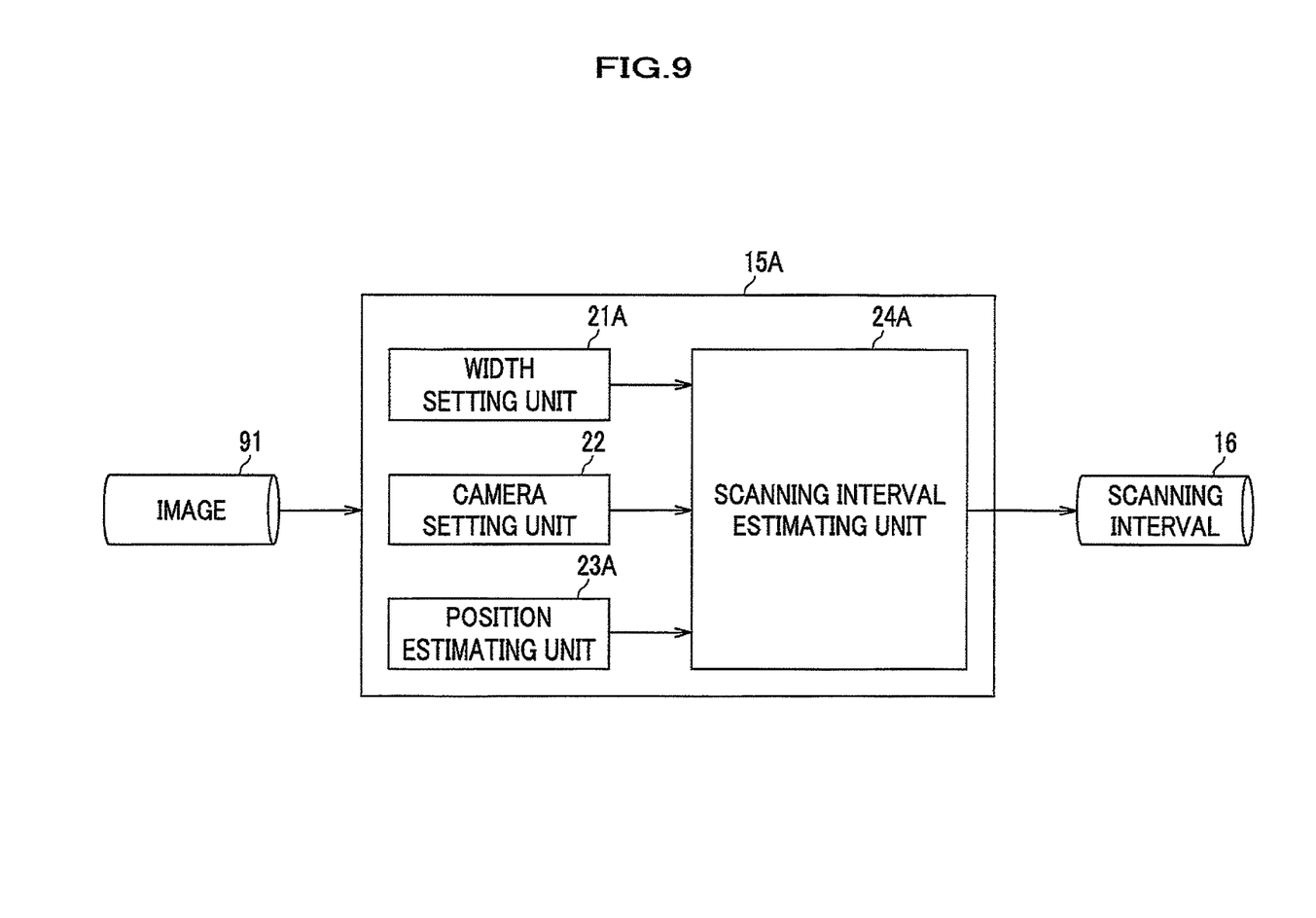
FIG. 9 is a functional block diagram of a scanning interval calculating unit which is included in the object detecting device according to the second embodiment.
Figure 10:
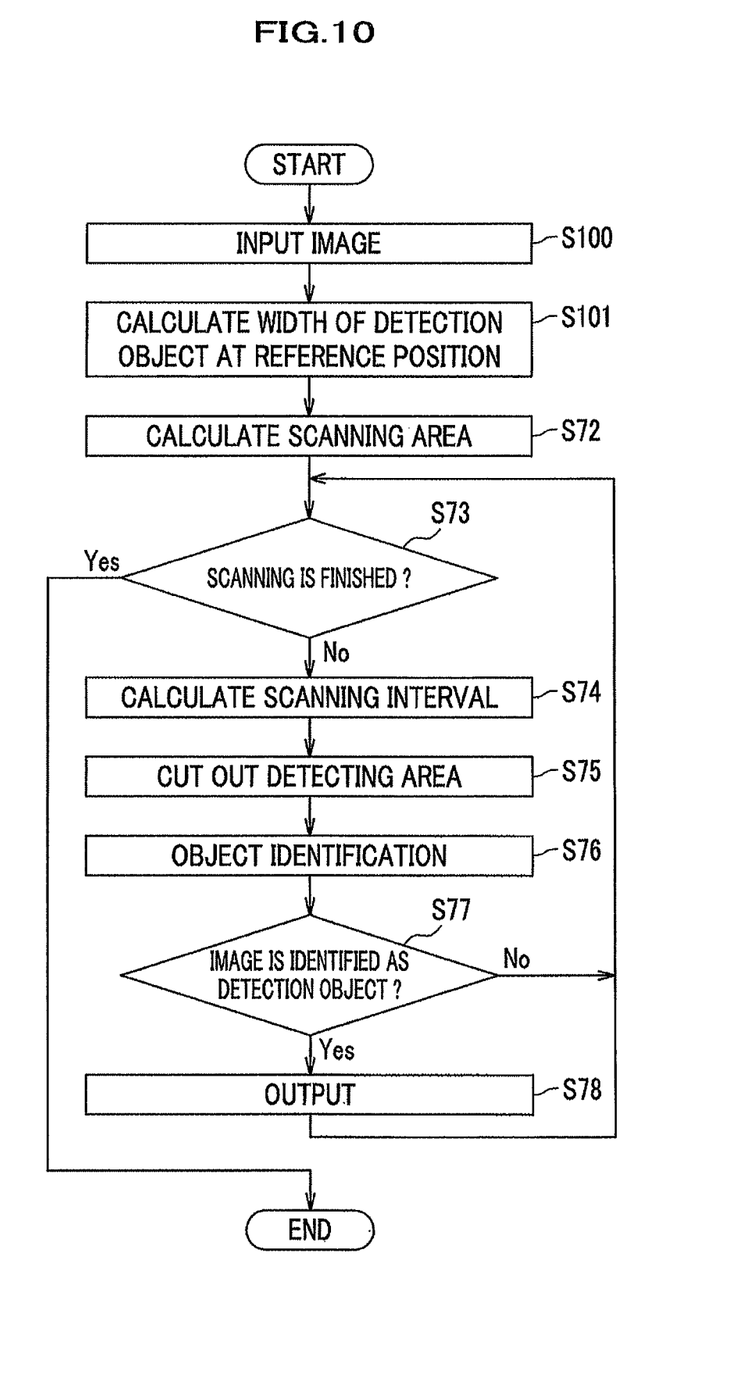
FIG. 10 is a flowchart showing an object detecting processing of the object detecting device according to the second embodiment.

FIG. 9 is a functional block diagram of the scanning interval calculating unit 15A included in the object detecting device 15A according to the second embodiment.

The scanning interval calculating unit 15A includes a width setting unit 21A, a camera setting unit 22, a position estimating unit 23A, and a scanning interval estimating unit 24A. Here, as a difference between the scanning interval calculating unit 15 (see FIG. 2) according to the first embodiment and the scanning interval calculating unit 15A according to the second embodiment, the width setting unit 21A, the position estimating unit 23A, and the scanning interval estimating unit 24A differ from those of the first embodiment. The other configuration is similar, and a description thereof will be omitted.

The width setting unit 21A is capable of setting a width of a detection object (width of person) using an image 91 which is acquired by the image acquiring unit 11. For example, a width of a detection object (width of person) on the image 91 is directly set by GUI (Graphical User Interface) which displays the image 91. There may be constructed a configuration in which a detection object (person) is measured and the image 91 by subjecting the image 91 to an image processing of motion detection or person detection, and the width of the detecting object (width of person) measured is acquired.

The position estimating unit 23A is configured to estimate a scanning position by measuring a relative distance which reflects a distance from a camera (long or short) on the image 91.

The scanning interval estimating unit 24A calculates the scanning interval 16 on the image using the width of the detection object (width of person) on the image 91 which is set by the width setting unit 21A, a camera parameter which is set by the camera setting unit 22, and the distance which is estimated by the position estimating unit 23A for a position to be scanned which is estimated by the position estimating unit 23A.

For example, with regard to the scanning interval 16 at the position to be scanned which is estimated by the position estimating unit 23A, a ratio of relative distances from the camera to the position of the detection object (person) which is set by the width setting unit 21A and from the camera to the position to be scanned which is estimated by the position estimating unit 23A is calculated, and the scanning interval 16 is calculated based on the ratio and the width of the detection object (person) which is set by the width setting unit 21A.

<Object Detecting Processing>

Next, a description will be given of an object detecting processing of the object detecting device 10A according to the second embodiment in reference to FIG. 10. FIG. 10 is a flowchart showing the object detecting processing of the object detecting device 10A according to the second embodiment. In the following description, the camera parameter 36, the 2D map information 35, and the detecting window information 37 are made to be previously set (input).

At step S100, the scanning interval calculating unit 15A inputs the image 91 which is acquired by the image acquiring unit 11.

At step S101, the scanning interval calculating unit 15A calculates the width of the detection object at the reference position. That is, the scanning interval calculating unit 15A calculates the width of the detection object at the reference position based on the width of the detection object on the image 91 which is set by the width setting unit 21A, the distance from the camera to the position of the detection object (person) which is set by the width setting unit 21A and the distance from the camera to the reference position.

Processings thereafter are similar to step S72 through step S78 of the object detecting processing of the first embodiment which has been explained in reference to FIG. 7, and a description thereof will be omitted.

In this way, according to the object detecting device 10A of the second embodiment, the scanning interval can be calculated based on the width of the detecting object on the image. Therefore, the scanning interval can be calculated more preferably than in the object detecting device 10 according to the first embodiment.

Modification

The object detecting device according to the present embodiment is not limited to the configuration of the embodiment described above but can be variously modified within the range not deviated from the gist of the present invention.

Although the description has been given of the object detecting device 10 according to the present embodiment which detects a person (detection object) from an image of a monitoring camera which is installed at a retail store, the object detecting device 10 is not limited thereto.

For example, the detecting object is not limited to a person but may be an object (for example, vehicle).

Although the image which is processed by the object detecting device 10 is made to be an image of a monitoring camera which is installed at a store, the image may be an image from a camera which is installed at a moving object (for example, vehicle).

Although the description has been given of the scanning unit 12 which calculates the scanning area 42 from the 2D map information 33 and the camera parameter 36, the scanning unit 12 is not limited thereto. For example, the scanning unit 12 may classify the detecting object to a passage, a shelf, a cash register by an image processing technology of segmentation or the like using the image of the monitoring camera which is acquired by the image acquiring unit 11, and calculate a portion of the classified passage (area where detection object is present) as the scanning area. The scanning unit 12 may extract the detection area based on the scanning area, the scanning interval 16 which is calculated by the scanning interval calculating unit 15 (see FIG. 1), and the detecting window information 37 which are calculated in this way.

Inputs of the 2D map information and the camera parameter can be saved by constructing the configuration in this way.

Although the description has been given of the scanning interval in the scanning direction (horizontal direction of image), according to the object detecting device 10 of the present embodiment, the scanning interval is not limited thereto but may be applicable also to an interval between scanning lines (vertical direction of image).

That is, an interval in a depth direction of scanning lines in the three-dimensional space 51 (see FIG. 5) is set. An interval between the scanning lines in a vertical direction of the image 52 is calculated by transforming an interval of prescribed scanning lines on the three-dimensional space 51 to an interval on the image 52. Incidentally, for example, the "method of Tsai" described above can be used as the transforming method.

An omission of detection in a depth direction can be reduced by scanning the detecting window based on an interval of scanning lines calculated in this way.

What is claimed is:

1. An object detecting device comprising:
   memory; and
   a processor connected to the memory,
   wherein the memory stores instructions that, when executed by the processor, cause the processor to execute:
   an image acquiring unit configured to acquire an image from a camera;
   a scanning interval calculating unit configured to calculate a scanning interval of a detection window for detecting a detection object in the image, where the scanning interval is calculated based on a camera parameter of the camera, a width of the detection object to be detected in a three-dimensional space, and position information of a position to be scanned in the three-dimensional space and where the scanning interval is a distance in a scanning direction between neighboring scanning positions of the detection window;
   a scanning unit configured to scan the detection window on the image using the scanning interval calculated by the scanning interval calculating unit; and
   a detecting unit configured to determine whether the detection object is present within the scanned detection window.

2. The object detecting device according to claim 1, wherein the scanning interval is set to be smaller than the width of the detection object in the image in a scanning direction of the detection window.

3. The object detecting device according to claim 1, wherein the scanning interval calculating unit includes:
   a position estimating unit configured to estimate the position information of the position to be scanned in the three-dimensional space, where the position information is a distance from the camera to the position to be scanned in the three-dimensional space, and
   wherein the scanning interval corresponds to a width of the detection object in the image.

4. The object detecting device according to claim 2, wherein the scanning interval calculating unit includes:
   a position estimating unit configured to estimate the position information of the position to be scanned in the three-dimensional space, where the position information is a distance from the camera to the position to be scanned in the three-dimensional space, and
   wherein the scanning interval corresponds to a width of the detection object in the image.

5. The object detecting device according to claim 3, wherein the scanning interval is varied depending on the distance from the camera to the position to be scanned.

6. The object detecting device according to claim 4, wherein the scanning interval is varied depending on the distance from the camera to the position to be scanned.

7. The object detecting device according to claim 5, wherein the scanning interval calculated for the position which is at a location which is further from the camera is smaller than the scanning interval calculated for the position which is at a location which is nearer to the camera.

8. The object detecting device according to claim 6, wherein the scanning interval the scanning interval calculated for the position which is at a location which is further from the camera is smaller than the scanning interval calculated for the position which is at a location which is nearer to the camera.

9. The object detecting device according to claim 2, wherein the detection object is a person, and the width of the detection object in the image in the scanning direction of the detection window is the width of the person in the image.

10. The object detecting device according to claim 3, wherein the detection object is a person, and the width of the detection object is the width of the person.

11. The object detecting device according to claim 4, wherein the detection object is a person, and the width of the detection object is the width of the person.

12. An object detecting method comprising:
   acquiring an image from a camera;
   calculating a scanning interval of a detection window for detecting a detection object in the image, where the scanning interval is calculated based on a camera parameter of the camera, a width of the detection object detected in a three-dimensional space, and position information of a position to be scanned in the three-dimensional space and where the scanning interval is a distance in a scanning direction between neighboring scanning positions of the detection window;
   scanning the detection window on the image using the calculated scanning interval; and
   determining whether the detection object is present within the scanned detection window.

* * * * *